United States Patent
Ito

(10) Patent No.: US 9,952,492 B2
(45) Date of Patent: Apr. 24, 2018

(54) PROJECTION-TYPE DISPLAY DEVICE AND LIGHT SOURCE CONTROL METHOD THEREFOR

(71) Applicant: FUJIFILM Corporation, Tokyo (JP)

(72) Inventor: Daisuke Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/471,887

(22) Filed: Mar. 28, 2017

(65) Prior Publication Data

US 2017/0201729 A1 Jul. 13, 2017

Related U.S. Application Data

(63) Continuation of application No. PCT/JP2015/063796, filed on May 13, 2015.

(30) Foreign Application Priority Data

Sep. 29, 2014 (JP) .................................. 2014-198453

(51) Int. Cl.
*G03B 21/20* (2006.01)
*H04N 9/31* (2006.01)
(Continued)

(52) U.S. Cl.
CPC ..... *G03B 21/2053* (2013.01); *G03B 21/2013* (2013.01); *G03B 33/12* (2013.01);
(Continued)

(58) Field of Classification Search
CPC ............ B60K 35/00; B60K 2350/2052; B60K 2350/2056; B60K 2350/2069; B60K 2350/352; G03B 21/2013; G03B 21/2053; G03B 33/12; H04N 9/3111; H04N 9/3155; H04N 9/3164; H04N 9/3194;
(Continued)

(56) References Cited

U.S. PATENT DOCUMENTS

| 7,888,623 B2 | 2/2011 | Kawashima et al. |
| 2004/0012844 A1 | 1/2004 | Ohtsuki et al. |

(Continued)

FOREIGN PATENT DOCUMENTS

| EP | 2731093 A1 | 5/2014 |
| JP | 2001-156388 A | 6/2001 |

(Continued)

OTHER PUBLICATIONS

German Office Action, dated Nov. 15, 2017, for German Application No. 112015004427.2.

(Continued)

*Primary Examiner* — Sultan Chowdhury
*Assistant Examiner* — Magda Cruz
(74) *Attorney, Agent, or Firm* — Birch, Stewart, Kolasch & Birch, LLP

(57) ABSTRACT

A projection-type display device includes: a plurality of light sources that emit light beams with different colors; a projection unit that projects light beams based on image information among light beams emitted from the plurality of light sources onto a projection screen; and a light source control unit that selectively performs first control or second control as defined herein.

8 Claims, 5 Drawing Sheets

(51) Int. Cl.
  *G03B 33/12* (2006.01)
  *G02B 27/01* (2006.01)
(52) U.S. Cl.
  CPC ......... *H04N 9/3111* (2013.01); *H04N 9/3155* (2013.01); *H04N 9/3164* (2013.01); *H04N 9/3194* (2013.01); *G02B 27/0101* (2013.01); *G02B 2027/0114* (2013.01); *G02B 2027/0118* (2013.01)
(58) Field of Classification Search
  CPC .... G02B 2027/0114; G02B 2027/0118; G02B 27/0101
  See application file for complete search history.

(56) References Cited

U.S. PATENT DOCUMENTS

| | | | |
|---|---|---|---|
| 2007/0047043 A1* | 3/2007 | Kapellner | G02B 27/0944 359/30 |
| 2007/0229774 A1 | 10/2007 | Hosokawa | |
| 2008/0165815 A1 | 7/2008 | Kamijima | |
| 2008/0198372 A1 | 8/2008 | Pan | |
| 2009/0206236 A1 | 8/2009 | Kawashima et al. | |
| 2010/0182354 A1 | 7/2010 | Shiratsuchi et al. | |
| 2010/0208758 A1 | 8/2010 | Kamijima | |
| 2012/0327379 A1* | 12/2012 | Enomoto | G03B 21/16 353/52 |
| 2014/0152711 A1 | 6/2014 | Sekiya et al. | |

FOREIGN PATENT DOCUMENTS

| | | |
|---|---|---|
| JP | 2005-189323 A | 7/2005 |
| JP | 2007-264244 A | 10/2007 |
| JP | 2007-334093 A | 12/2007 |
| JP | 2008-193054 A | 8/2008 |
| JP | 2008-201407 A | 9/2008 |
| JP | 2009-192772 A | 8/2009 |
| JP | 2010-164843 A | 7/2010 |
| JP | 2011-166396 A | 8/2011 |
| JP | 2013-67209 A | 4/2013 |
| JP | 4838397 B1 | 4/2013 |
| JP | 2013-246236 A | 12/2013 |
| WO | WO 2013/005525 A1 | 1/2013 |

OTHER PUBLICATIONS

International Preliminary Report on Patentability issued in PCT/JP2015/063796 (PCT/IPEA/409), dated Apr. 20, 2016.
International Search Report issued in PCT/JP2015/063796 (PCT/ISA/210), dated Aug. 4, 2015.
Written Opinion of the International Searching Authority issued in PCT/JP2015/063796 (PCT/ISA/237), dated Aug. 4, 2015.

* cited by examiner

PROJECTION-TYPE DISPLAY DEVICE AND LIGHT SOURCE CONTROL METHOD THEREFOR

CROSS REFERENCE TO RELATED APPLICATION

This is a continuation of International Application No. PCT/JP2015/063796 filed on May 13, 2015, and claims priority from Japanese Patent Application No. 2014-198453 filed on Sep. 29, 2014, the entire disclosures of which are incorporated herein by reference.

BACKGROUND OF THE INVENTION

1. Field of the Invention

The present invention relates to a projection-type display device and a light source control method therefor.

2. Description of the Related Art

There are known head-up display (HUD) apparatuses for vehicles for projecting projection light beams on a screen, which is a combiner disposed on a front glass of a vehicle or in the vicinity of the front of the front glass, so as to display an image (for example, refer to JP2013-246236A and JP2011-166396A). Through such an HUD, a user is able to see an image, which is displayed on the front glass or the like through projection light beams projected from the HUD, in a state where the image is superimposed on a landscape of the front of own vehicle on the rear side of the front glass or the like.

In general, for image display, the HUD is equipped with a light source that emits red light beams, a light source that emits green light beams, and a light source that emits blue light beams.

JP2013-246236A discloses a system using light sources such as semiconductor lasers, in which light emission efficiencies at a high temperature are greatly lowered, as light sources mounted on the HUD.

The HUD disclosed in JP2013-246236A has a display unit dedicated for notifying an abnormal state to a user. The HUD is configured to stop image display using the light sources under high temperature environment, in which a brightness of an image projected onto a screen is lowered, and to perform error display on the display unit.

JP2011-166396A discloses an HUD that performs image display by two-dimensionally scanning light beams emitted from light sources including a light source which emits red light beams, a light source which emits green light beams, and a light source which emits blue light beams, through scanning means. In the HUD, a brightness of important information, which should be notified to a user, is increased by controlling a speed of the scanning performed by the scanning means.

SUMMARY OF THE INVENTION

In HUDs such as an HUD for a vehicle which can be used under bright environment, there may be a demand to achieve an increase in visibility by increasing a brightness of a displayed image. In particular, considering that a user is notified of abnormality such as failure or a user is notified of such an emergency situation as gasoline is running short, it is important to achieve improvement of visibility.

However, amounts of emitted light beams of a plurality of light sources used in the HUD mostly depends on a temperature thereof. Hence, if the HUD is used under high temperature environment, a brightness of the displayed image is unlikely to be sufficiently increased.

Further, if the amounts of emitted light beams of the light sources are increased to increase the brightness of the displayed image, an amount of heat generation in the light source unit is also increased in accordance therewith. The amounts of emitted light beams are lowered by the increase in temperature due to the increase of the amount of heat generation, it is difficult to sufficiently increase the brightness of the displayed image. Further, under environment where used electric power is restricted, it is difficult to increase the amounts of emitted light beams of the light sources.

In JP2013-246236A, an abnormal state is displayed on the dedicated display unit, and is notified to a user. However, in this case, the dedicated display unit is necessary, and thus costs of the HUD increases. Further, in the abnormal state, image display is not performed, and thus usability is poor.

JP2011-166396A is a method effective for a system that is able to display important information by increasing the brightness thereof but that performs image display by two-dimensionally scanning light beams emitted from the light sources.

There is an HUD using a so-called field sequential method of obtaining a color image by switching a liquid crystal panel on the basis of red, green, and blue image data in a face sequential scanning manner, sequentially switching light emitted on a liquid crystal panel surface in synchronization therewith in a chronological order of red light, green light, and blue light at a high speed, and synthesizing residual images corresponding to respective color light beams on human retina. The method disclosed in JP2011-166396A cannot be applied to the field sequential method.

The present invention has been made in consideration of the above-mentioned situation, and its object is to provide a projection-type display device that performs image display in a method of emitting light from a plurality of light sources, which emit light beams with different colors, in a time-division manner and that is capable to improving visibility of specific information without increasing power consumption.

Provided is a projection-type display device of the present invention comprising: a plurality of light sources that emit light beams with different colors; a projection unit that projects light beams based on image information among light beams emitted from the plurality of light sources onto a projection screen; and a light source control unit that selectively performs first control for setting respective amounts of light beams emitted from the plurality of light sources to a predetermined light emission amount pattern and sequentially emitting the light beams from the plurality of light sources through a predetermined light emission pattern, or second control for setting an amount of light beams emitted from a specific light source among the plurality of light sources to an amount of emitted light beams greater than the amounts of emitted light beams which are set by the light emission amount pattern, setting amounts of light beams emitted from light sources other than the specific light source among the plurality of light sources to an amount of emitted light beams smaller than the amounts of emitted light beams which are set by the light emission amount pattern, and sequentially emitting the light beams from the plurality of light sources through the light emission pattern.

Provided is a light source control method of a projection-type display device of the present invention. In the method, the light emission pattern includes a first pattern, in which a time period during which the light beams are sequentially emitted from the plurality of light sources and a time period during which the light beams are sequentially emitted from the light sources other than the specific light source among the plurality of light sources are alternately repeated, and a second pattern in which a time period during which the light beams are sequentially emitted from the plurality of light sources continues. In the light source control step, the amount of emitted light beams, which is set to the specific light source in a case where the light beams are sequentially emitted through the first pattern, is made to be greater than that in a case where the light beams are sequentially emitted through the second pattern, in the second control.

According to the present invention, in a projection-type display device that performs image display in a method of emitting light from a plurality of light sources, which emit light beams with different colors, in a time-division manner, it is possible to improving visibility of specific information without increasing power consumption.

DESCRIPTION OF THE PREFERRED EMBODIMENTS

Hereinafter, embodiments of the present invention will be described with reference to drawings.

Figure 1:
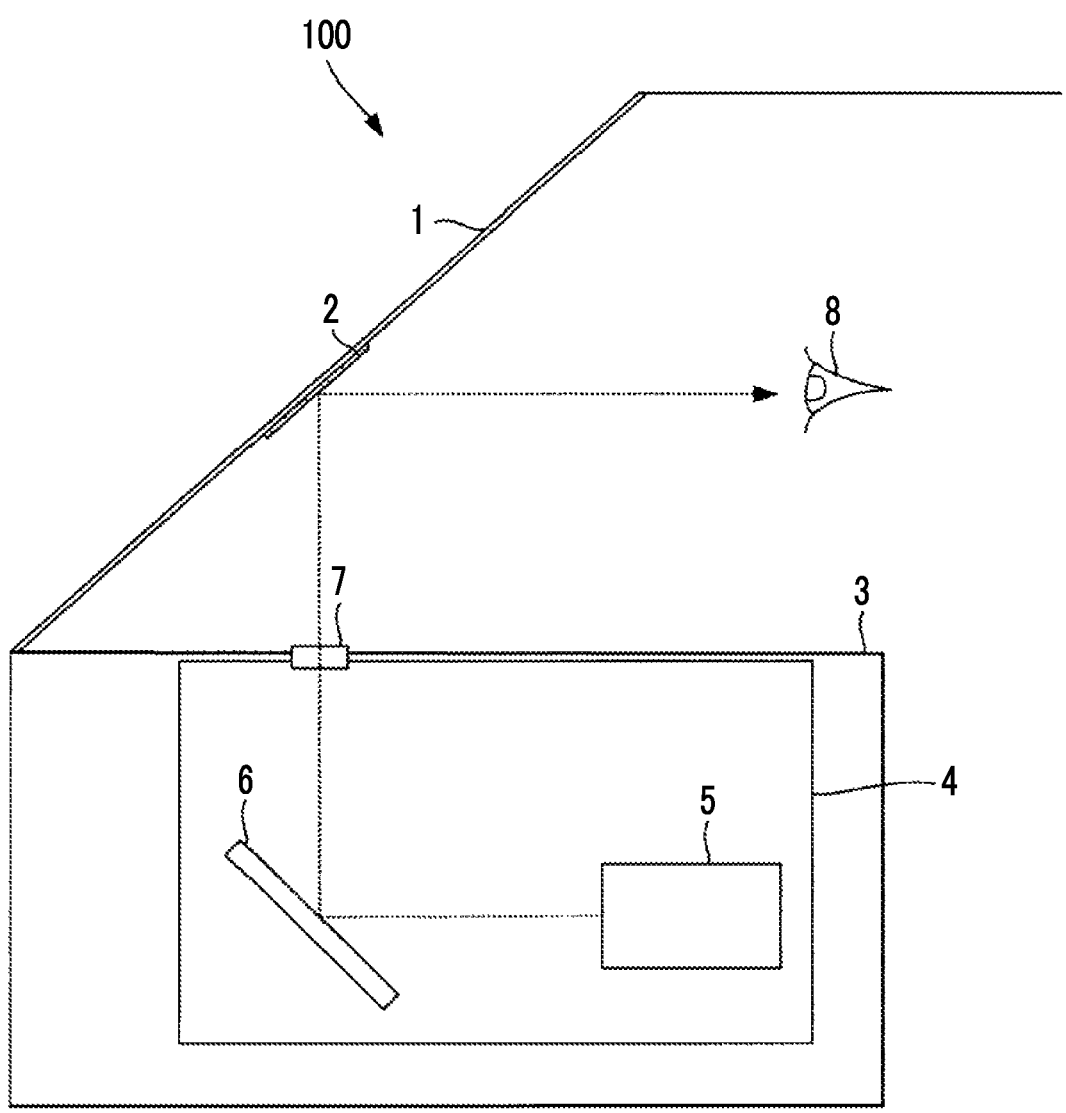
FIG. 1 is a diagram illustrating a configuration of an HUD which is an embodiment of a projection-type display device of the present invention.

FIG. 1 is a diagram illustrating a configuration of an HUD which is an embodiment of a projection-type display device of the present invention.

The HUD shown in FIG. 1 comprises: a projection unit 4 that is built into a dashboard 3 of a vehicle 100; and a combiner 2 that is attached to the inner surface of the front glass 1 of the vehicle 100.

The projection unit 4 comprises: a display unit 5; a mirror 6 that reflects light which is emitted from the display unit 5 and is based on image information; and an opening portion 7 that is for emitting the light reflected by the mirror 6 to the outside.

The combiner 2 is a projection screen onto which the light projected from the opening portion 7 is projected, and reflects the light. A driver 8 of the vehicle 100 is able to visually check information about driving by viewing the light reflected by the combiner 2. Further, the combiner 2 has a function of reflecting the light projected from the opening portion 7 and transmitting the light incident from the outside (outer region) of the front glass 1. Hence, the driver 8 is able to see an image, which is based on the light projected from the opening portion 7, and a landscape of the outer region outside the front glass 1.

Figure 2:
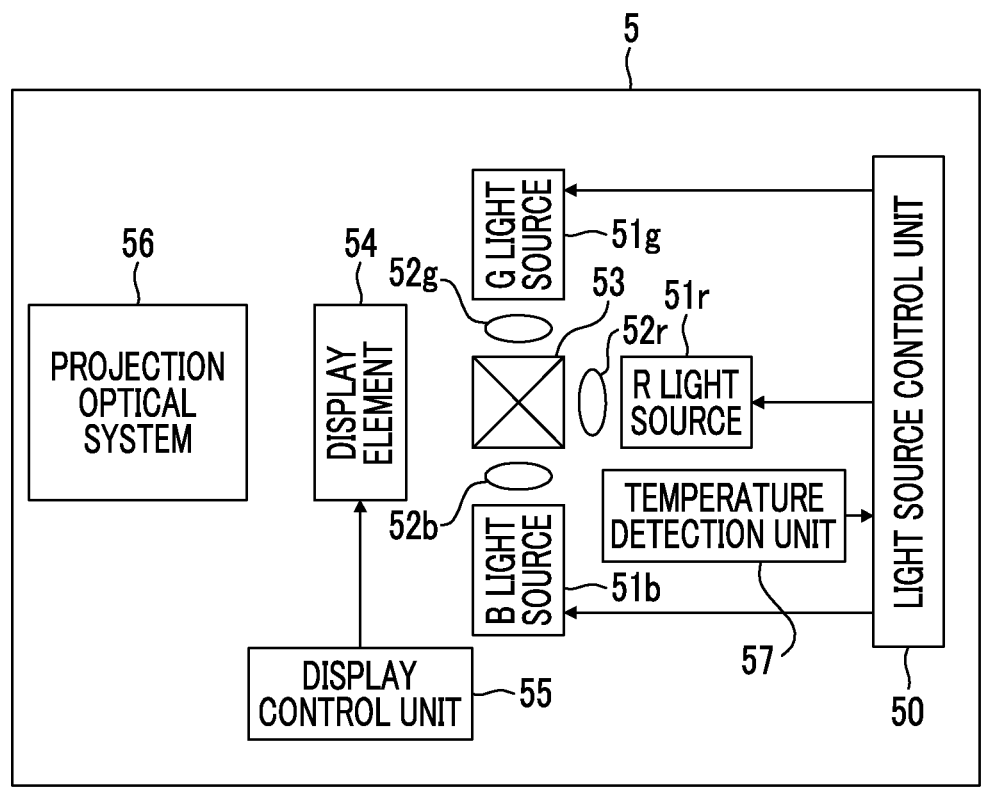
FIG. 2 is a diagram illustrating a configuration of a display unit 5 shown in FIG. 1.

FIG. 2 is a diagram illustrating a configuration of the display unit 5 shown in FIG. 1.

The display unit 5 comprises: a light source control unit 50; an R light source 51r that emits red light beams; a G light source 51g that emits green light beams; a B light source 51b that emits blue light beams; a dichroic prism 53; a collimator lens 52r that is provided between the R light source 51r and the dichroic prism 53; a collimator lens 52g that is provided between the G light source 51g and the dichroic prism 53; a collimator lens 52b that is provided between the B light source 51b and the dichroic prism 53; a display element 54; a display control unit 55; a projection optical system 56; and a temperature detection unit 57.

The R light source 51r, the G light source 51g, and the B light source 51b each employ a laser or a light emitting element such as a light emitting diode (LED).

The temperature detection unit 57 detects a temperatures (particularly, temperatures of the vicinities of the R light source 51r, the G light source 51g, and the B light source 51b) in the display unit 5, and notifies the detected temperatures to the light source control unit 50.

The dichroic prism 53 reflects R light collimated through the collimator lens 52r, and emits R light to the display element 54. Further, the dichroic prism 53 transmits G light collimated through the collimator lens 52g, and emits G light to the display element 54. Furthermore, the dichroic prism 53 reflects B light collimated through the collimator lens 52b, and emits B light to the display element 54.

The light source control unit 50 selectively performs first control or second control.

The first control is control for setting respective amounts of light beams emitted from the R light source 51r, the G light source 51g, and the B light source 51b to a predetermined light emission amount pattern and sequentially emitting the light beams from the R light source 51r, the G light source 51g, and the B light source 51b through a predetermined light emission pattern.

The second control is control for setting an amount of light beams emitted from the R light source 51r, which is a specific light source, among the R light source 51r, the G light source 51g, and the B light source 51b to an amount of emitted light beams greater than the amounts of emitted light beams which are set by the light emission amount pattern, setting amounts of light beams emitted from the G light source 51g and the B light source 51b other than the specific light source among the R light source 51r, the G light source 51g, and the B light source 51b to an amount of emitted light beams smaller than the amounts of emitted light beams which are set by the light emission amount pattern, and sequentially emitting the light beams from the R light source 51r, the G light source 51g, and the B light source 51b through the light emission pattern.

The light source control unit 50 performs the second control in a case where the temperature of the inside of the display unit 5 detected by the temperature detection unit 57 is greater than a threshold value TH, and performs the first control in a case where the temperature of the inside of the display unit 5 detected by the temperature detection unit 57 is equal to or less than the threshold value TH.

The display element 54 includes, for example, a liquid crystal display panel in which multiple liquid crystal display pixels having no color filters are two-dimensionally arranged. Under the control of the display control unit 55, the display element 54 controls transmittances of the respective liquid crystal display pixels in accordance with color components constituting the respective pixels of the image information to be displayed.

The display control unit 55 performs R transmittance control to adjust the liquid crystal display pixels to a transmittance corresponding to a red component in the image information, G transmittance control to adjust the liquid crystal display pixels to a transmittance corresponding to a green component in the image information, and B transmittance control to adjust the liquid crystal display pixels to a transmittance corresponding to a blue component in the image information.

The display control unit 55 performs the R transmittance control in synchronization with a time period in which the light source control unit 50 causes the R light source 51r to emit light. The display control unit 55 performs the G transmittance control in synchronization with a time period in which the light source control unit 50 causes the G light source 51g to emit light. The display control unit 55 performs the B transmittance control in synchronization with a time period in which the light source control unit 50 causes the B light source 51b to emit light.

The projection optical system 56 is an optical system for projecting the light, which is emitted from the display element 54 and is based on the image information, onto the mirror 6. The projection optical system 56 and the mirror 6 constitute a projection unit that projects the light, which is emitted from the display element 54 and is based on the image information, onto the combiner 2 as a projection screen.

Figure 3:
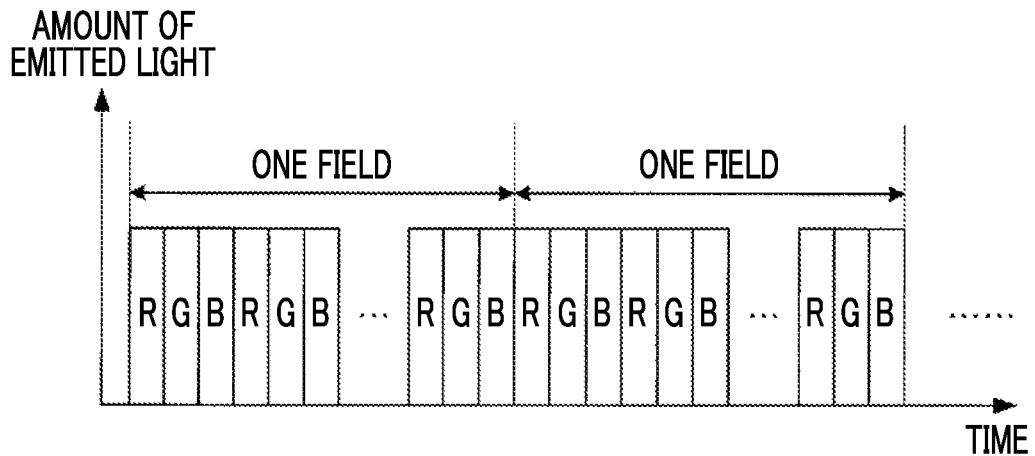
FIG. 3 is a diagram illustrating first control which is performed by a light source control unit 50.

FIG. 3 is a diagram illustrating first control which is performed by a light source control unit 50. In FIG. 3, blocks denoted by "R" indicates a time period during which the R light source 51r is allowed to emit light beams. Blocks denoted by "G" indicates a time period during which the G light source 51g is allowed to emit light beams. Blocks denoted by "B" indicates a time period during which the B light source 51b is allowed to emit light beams. A height of each block indicates a light emission intensity of the emitted light beams. A product (an area of each block) of a length of the time period of each block and the light emission intensity indicates an amount of emitted light beams of each block.

In the HUD shown in FIG. 1, by displaying information about driving as a moving image on the display element 54, the information is presented to a driver. A time period, during which still images constituting the moving image are displayed on the display element 54, is hereinafter referred to as a field.

In the example of FIG. 3, the light source control unit 50 sets respective amounts of light beams emitted from the R light source 51r, the G light source 51g, and the B light source 51b to the light emission amount pattern for making all the amounts of emitted light beams the same, and emits the light beams through the light emission pattern for causing the R light source 51r, the G light source 51g, and the B light source 51b to sequentially perform light emission in this order.

Figure 4:
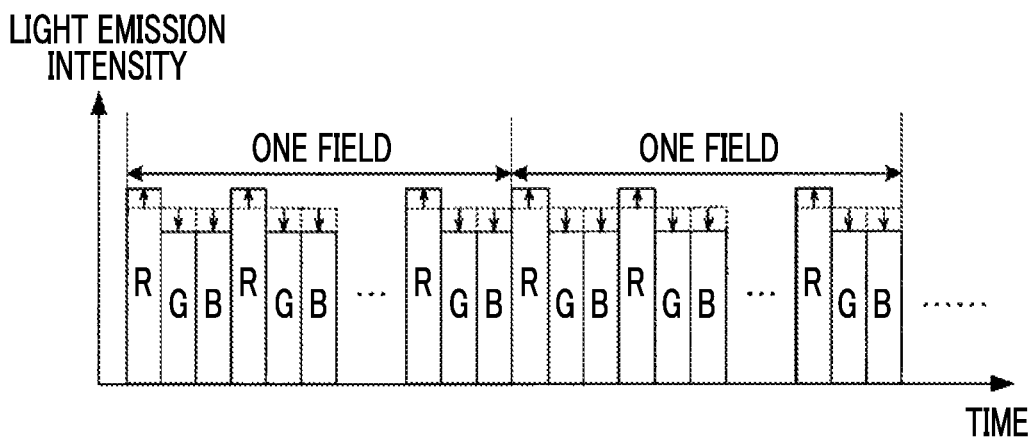
FIG. 4 is a diagram illustrating second control which is performed by the light source control unit 50.

FIG. 4 is a diagram illustrating second control which is performed by a light source control unit 50.

In the example of FIG. 4, the light source control unit 50 makes a light emission intensity of the R light source 51r greater than that in the first control of FIG. 3, and makes respective light emission intensities of the G light source 51g and the B light source 51b smaller than those in the first control of FIG. 3. Thereby, the amount of emitted light beams of the R light source 51r is made to be greater than that in the first control, and the respective amounts of emitted light beams of the G light source 51g and the B light source 51b is made to be smaller than those in the first control.

Figure 5:
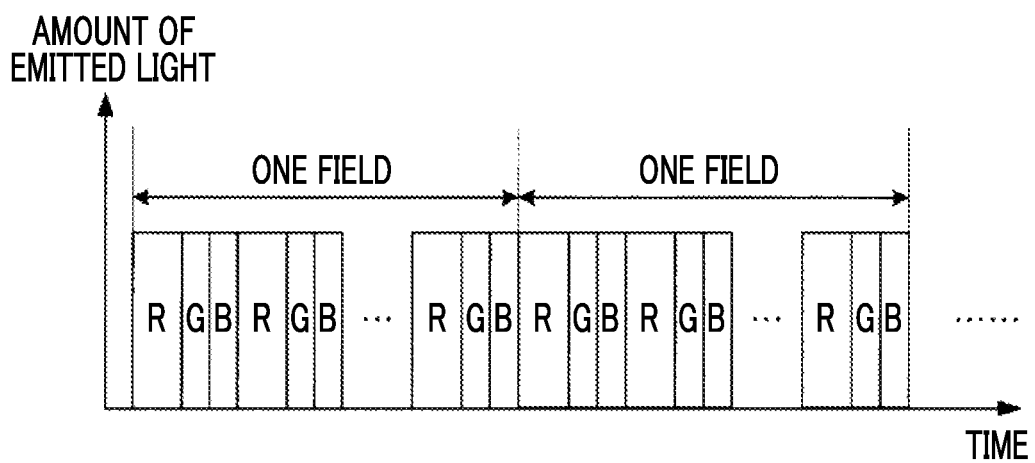
FIG. 5 is a diagram illustrating another example of the second control which is performed by the light source control unit 50.

FIG. 5 is a diagram illustrating another example of the second control which is performed by a light source control unit 50.

In the example of FIG. 5, the light source control unit 50 makes a time period of light emission of the R light source 51r longer than that in the first control of FIG. 3, and makes respective time periods of light emission of the G light source 51g and the B light source 51b shorter than those in the first control of FIG. 3. Thereby, the amount of emitted light beams of the R light source 51r is made to be greater than that in the first control, and the respective amounts of emitted light beams of the G light source 51g and the B light source 51b is made to be smaller than those in the first control.

In the HUD shown in FIG. 1, the important information to be notified to the driver in the moving image confirmed by the driver 8 is displayed in red. Examples of the important information include: information for giving a notification that gasoline is running short; information for giving a notification that a pedestrian is in the vicinity of the vehicle 100; and information for giving a notification of a speed of the vehicle 100.

Light emission intensities of the light emitting elements, which are used as the R light source 51r, the G light source 51g, and the B light source 51b, are lowered in accordance an increase in temperature. For example, LEDs may be used as the light emitting elements. In this case, as compared with the light emission intensities of the G light source 51g and the B light source 51b, the light emission intensity of the R light source 51r with respect to an increase in temperature is greatly lowered.

Hence, if the temperature detected by the temperature detection unit 57 is greater than the threshold value TH at which the light emission intensity of the R light source 51r is started to be greatly lowered, a display brightness of a red text displayed as the important information is lowered. As a result, there is even a possibility that important information cannot be clearly notified to the driver 8.

Accordingly, the light source control unit 50 performs the second control in a case where the temperature detected by the temperature detection unit 57 is greater than the threshold value TH.

Under the second control, the amount of emitted light beams of the R light source 51r increases to be greater than that under the first control, and the amounts of emitted light beams of the G light source 51g and the B light source 51b decreases to be less than that under the first control. Therefore, by increasing the amount of emitted light beams of the R light source 51r which is the specific light source without increasing an amount of heat generation and power consumption due to light emission of the entire three light sources, it is possible to ensure visibility of the important information.

In the example of FIG. 3, the light emission intensity of the R light source 51r, the light emission intensity of the G light source 51g, and the light emission intensity of the B light source 51b are set to be equal to each other, but each light emission intensity may be set through an arbitrary pattern.

Even in this case, under the second control, the light emission intensity of the R light source 51r may be set to be greater than that under the first control, and the respective light emission intensities of the G light source 51g and the B light source 51b may be set to be less than those under the first control. Alternately, under the second control, the time period of light emission of the R light source 51r may be set to be longer than that under the first control, and the respective time periods of light emission of the G light source 51g and the B light source 51b may be set to be shorter than those under the first control.

In addition, under the second control, the respective amounts of emitted light beams of the G light source 51g and the B light source 51b may be set to zero. In such a manner, the amount of emitted light beams of the R light source 51r can be maximized. As a result, it is possible to satisfactorily ensure visibility of the important information.

The light source control unit 50 may control the respective amounts of emitted light beams of the G light source 51g and the B light source 51b in the second control, in accordance with a degree of importance of the important information.

For example, in a case where information for giving a notification that a pedestrian are popping out is displayed, the light source control unit 50 sets the respective amounts of emitted light beams of the G light source 51g and the B light source 51b to zero, and maximizes visibility of the image.

In a case where information for giving a notification of a speed is displayed, the light source control unit 50 sets the respective amounts of emitted light beams of the G light source 51g and the B light source 51b to, for example, about 80% of that in the first control. In such a manner, flexible control according to the driving situation becomes possible.

As described above, by preventing the total temperature obtained by heat generation of the three light sources and the total power consumption necessary to operate the three light sources from changing through the first control and the second control, reduction in power consumption of the HUD can be achieved.

Figure 6:
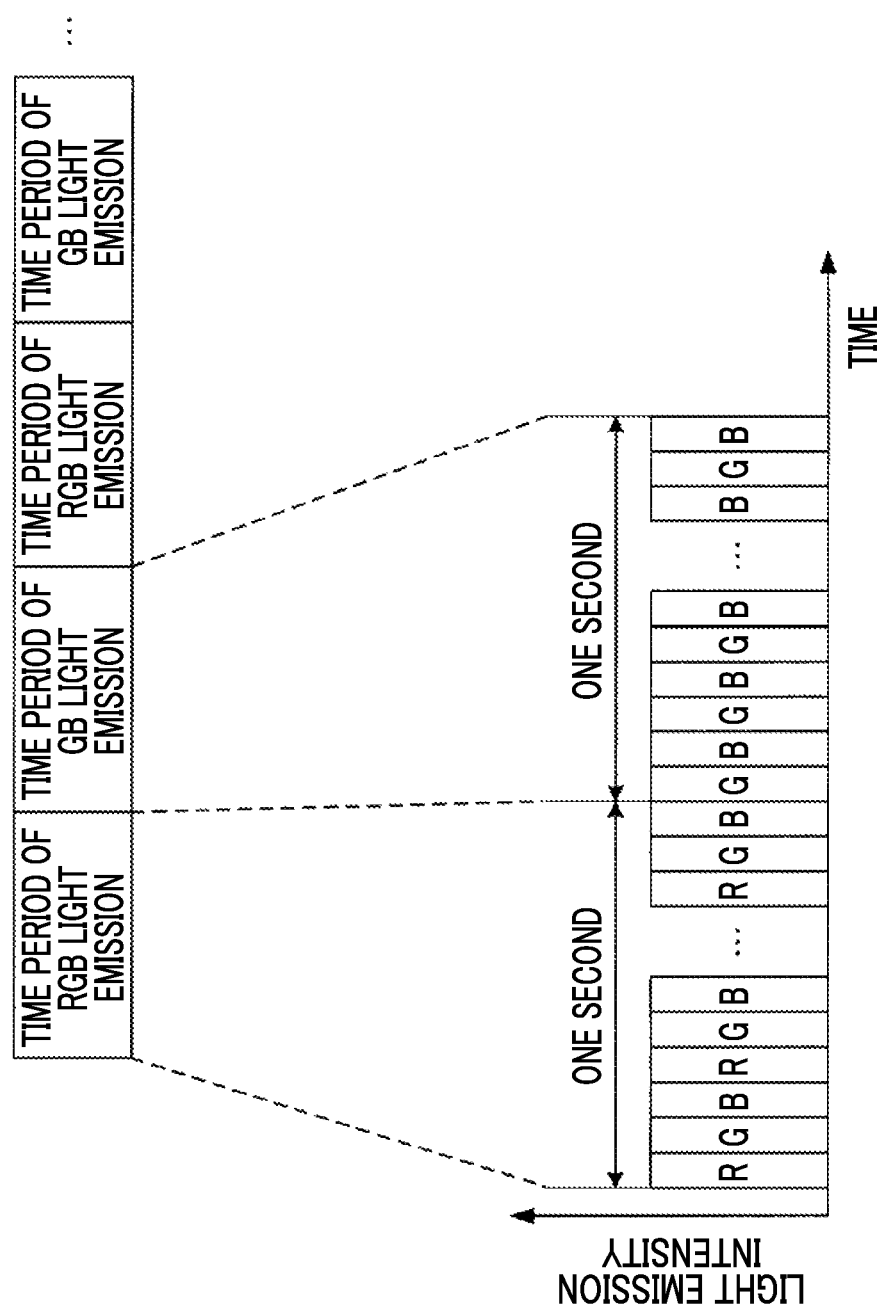
FIG. 6 is a diagram illustrating another example of the first control.

FIG. 6 is a diagram illustrating another example of the first control.

The light emission pattern of the light sources in the first control shown in FIG. 6 is a first pattern. In the first pattern, the following fields are alternately repeated: a field in which light beams are sequentially emitted from the R light source 51r, the G light source 51g, and the B light source 51b, for example, a time period of RGB light emission which is continuously performed for one second; and a field in which light beams are emitted from the G light source 51g and the B light source 51b, for example, a time period of GB light emission which is continuously performed for one second.

In addition, the light emission pattern of the light sources in the first control shown in FIG. 4 becomes a second pattern in which the time period of RGB light emission shown in FIG. 6 continues.

If the light source control unit 50 performs the first control shown in FIG. 6, red portions on the image seen from the driver 8 flash in every other second. In the HUD, as in the first control, by displaying important information indicated by the red portions in a blinking manner, visibility of the important information is enhanced.

Figure 7:
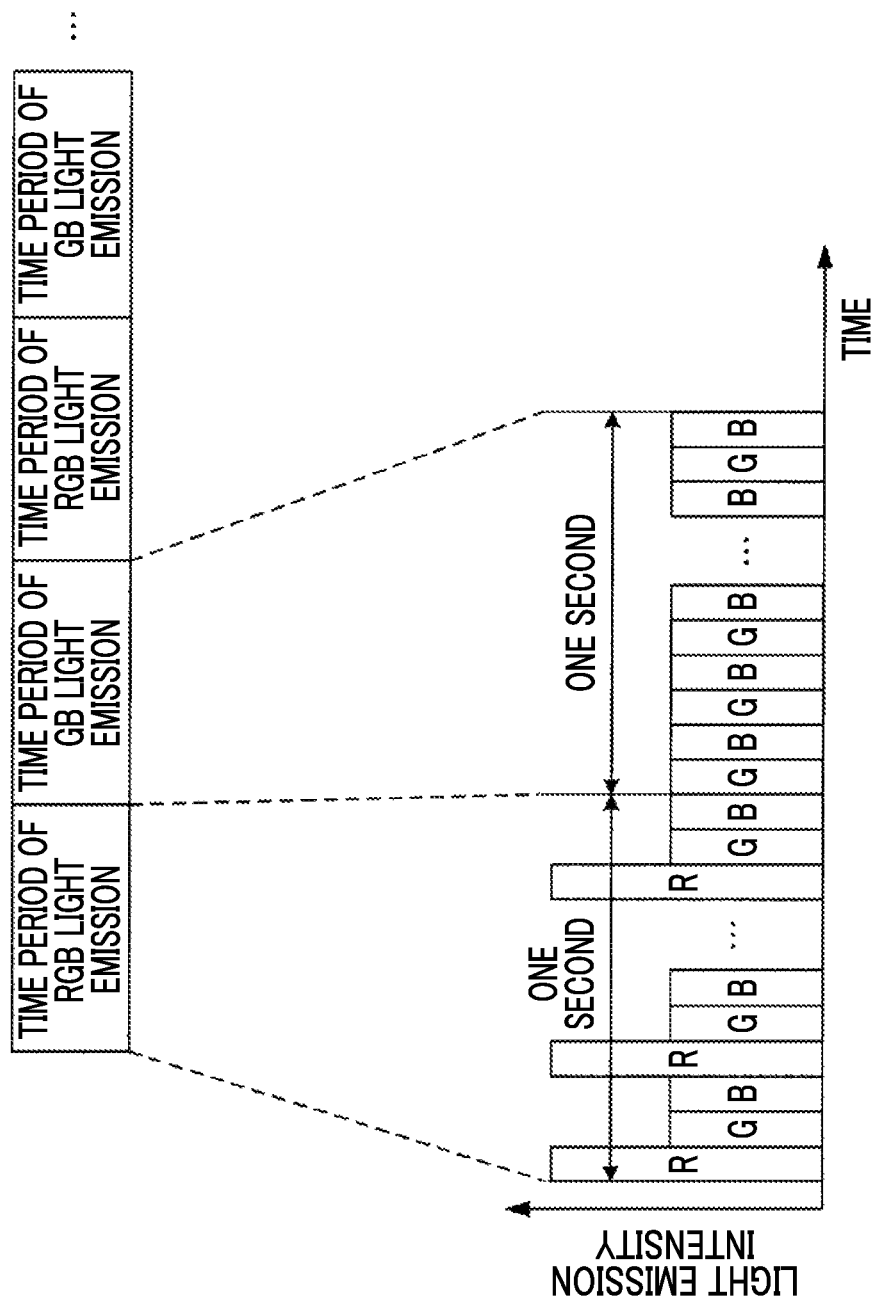
FIG. 7 is a diagram illustrating another example of the second control.

In a case of performing the first control shown in FIG. 6 instead of the first control shown in FIG. 3, as the second control, the light source control unit 50 performs control shown in FIG. 7. In the second control shown in FIG. 7, the light emission intensities of the G light source 51g and the B light source 51b is the same as that in the second control shown in FIG. 4, but the light emission intensity of the R light source 51r is set to be greater than the light emission intensity of the R light source 51r in the second control shown in FIG. 4.

In the second control shown in FIG. 7, the R light source 51r does not emit light beams in the time period of GB light emission, an increase in temperature of the R light source 51r is suppressed during this time period. Further, electric power for light emission is not necessary for the R light source 51r during this time period. From these facts, there is room for increasing the light emission intensity of the R light source 51r to a large extent during the time period of RGB light emission. Therefore, it is possible to further improve visibility of the important information by increasing the light emission intensity of the R light source 51r such that it is greater than that in the second control shown in FIG. 4.

In the above description, the R light source 51r is taken as an example of the specific light source, but the specific light source may be the G light source 51g or the B light source 51b. Further, the HUD including the three light sources of the R light source 51r, the G light source 51g, and the B light source 51b is taken as an example, but the number of light sources may be two or four or more.

Further, although the light source control unit 50 switches between the first control and the second control in accordance with the temperature detected by the temperature detection unit 57, in a case where it is necessary to display important information (for example, in a case where gasoline is running short and it is necessary to display information for a notification therefor), switching from the first control to the second control may be performed at that timing. Alternatively, it is also possible to provide an illuminance sensor for detecting the brightness of the outside world, and switching from the first control to the second control may be performed in a case where the brightness detected by the illuminance sensor becomes equal to or greater than a predetermined value.

As described above, the present description discloses the following items.

A disclosed projection-type display device of the present invention comprises: a plurality of light sources that emit light beams with different colors; a projection unit that projects light beams based on image information among light beams emitted from the plurality of light sources onto a projection screen; and a light source control unit that selectively performs first control for setting respective amounts of light beams emitted from the plurality of light sources to a predetermined light emission amount pattern and sequentially emitting the light beams from the plurality of light sources through a predetermined light emission pattern, or second control for setting an amount of light beams emitted from a specific light source among the plurality of light sources to an amount of emitted light beams greater than the amounts of emitted light beams which are set by the light emission amount pattern, setting amounts of light beams emitted from light sources other than the specific light source among the plurality of light sources to an amount of emitted light beams smaller than the amounts of emitted light beams which are set by the light emission amount pattern, and sequentially emitting the light beams from the plurality of light sources through the light emission pattern.

In the disclosed projection-type display device, the light source control unit sets the amounts of the emitted light beams, which are set to the light sources other than the specific light source in the second control, to zero.

In the disclosed projection-type display device, the plurality of light sources includes a red light source that emits red light beams, a green light source that emits green light beams, and a blue light source that emits blue light beams, and the specific light source is the red light source.

The disclosed projection-type display device, further comprises a temperature detection unit that detects a temperature. The light source control unit performs the second control in a case where the temperature detected by the temperature detection unit is greater than a threshold value, and performs the first control in a case where the temperature detected by the temperature detection unit is equal to or less than the threshold value.

In the disclosed projection-type display device, the light emission pattern includes a first pattern, in which a time period during which the light beams are sequentially emitted from the plurality of light sources and a time period during which the light beams are sequentially emitted from the light sources other than the specific light source among the plurality of light sources are alternately repeated, and a second pattern in which a time period during which the light beams are sequentially emitted from the plurality of light sources continues. The light source control unit makes the amount of emitted light beams, which is set to the specific light source in a case where the light beams are sequentially emitted through the first pattern, greater than that in a case where the light beams are sequentially emitted through the second pattern, in the second control.

There is provided a light source control method of a projection-type display device having a plurality of light sources that emit light beams with different colors, and a projection unit that projects light beams based on image information among light beams emitted from the plurality of light sources onto a projection screen. The method comprises a light source control step that selectively performs first control for setting respective amounts of light beams emitted from the plurality of light sources to a predetermined light emission amount pattern and sequentially emitting the light beams from the plurality of light sources through a predetermined light emission pattern, or second control for setting an amount of light beams emitted from a specific light source among the plurality of light sources to an amount of emitted light beams greater than the amounts of emitted light beams which are set by the light emission amount pattern, setting amounts of light beams emitted from light sources other than the specific light source among the plurality of light sources to an amount of emitted light beams smaller than the amounts of emitted light beams which are set by the light emission amount pattern, and sequentially emitting the light beams from the plurality of light sources through the light emission pattern.

In the disclosed light source control method, in the light source control step, the amounts of the emitted light beams, which are set to the light sources other than the specific light source in the second control, are set to zero.

In the disclosed light source control method, the plurality of light sources includes a red light source that emits red light beams, a green light source that emits green light beams, and a blue light source that emits blue light beams, and the specific light source is the red light source.

In the disclosed light source control method, in the light source control step, the second control is performed in a case where the temperature detected by the temperature detection unit is greater than a threshold value, and the first control is performed in a case where the temperature detected by the temperature detection unit is equal to or less than the threshold value.

In the disclosed light source control method, the light emission pattern includes a first pattern, in which a time period during which the light beams are sequentially emitted from the plurality of light sources and a time period during which the light beams are sequentially emitted from the light sources other than the specific light source among the plurality of light sources are alternately repeated, and a second pattern in which a time period during which the light beams are sequentially emitted from the plurality of light sources continues. In the light source control step, the amount of emitted light beams, which is set to the specific light source in a case where the light beams are sequentially emitted through the first pattern, is made to be greater than that in a case where the light beams are sequentially emitted through the second pattern, in the second control.

INDUSTRIAL APPLICABILITY

The present invention is applied to particularly an on-board HUD, and is thus convenient and effective.

The present invention has been described in detail with reference to specific embodiments. However, it is apparent to those skilled in the art that various modifications variations may be made without departing from the technical spirit and scope of the invention.

The present application is based on Japanese Patent Application (JP2014-198453A) filed on Sep. 29, 2014, the content of which is incorporated herein by reference.

EXPLANATION OF REFERENCES

50: light source control unit
51$r$: red light source
51$g$: green light source
51$b$: blue light source

What is claimed is:
1. A projection-type display device comprising:
a plurality of light sources that emit light beams with different colors;
a projection unit that projects light beams based on image information among light beams emitted from the plurality of light sources onto a projection screen;
a light source control unit that selectively performs first control for setting respective amounts of light beams emitted from the plurality of light sources to a predetermined light emission amount pattern and sequentially emitting the light beams from the plurality of light sources through a predetermined light emission pattern, or second control for setting an amount of light beams emitted from a specific light source among the plurality of light sources to an amount of emitted light beams greater than the amounts of emitted light beams which are set by the light emission amount pattern, setting amounts of light beams emitted from light sources other than the specific light source among the plurality of light sources to an amount of emitted light beams smaller than the amounts of emitted light beams which are set by the light emission amount pattern, and sequentially emitting the light beams from the plurality of light sources through the light emission pattern; and
a temperature detection unit that detects a temperature,
wherein the light source control unit performs the second control in a case where the temperature detected by the temperature detection unit is greater than a threshold value, and performs the first control in a case where the temperature detected by the temperature detection unit is equal to or less than the threshold value,
the light emission pattern includes a first pattern, in which a time period during which the light beams are sequentially emitted from the plurality of light sources and a time period during which the light beams are sequentially emitted from the light sources other than the specific light source among the plurality of light sources are alternately repeated, and a second pattern in which a time period during which the light beams are sequentially emitted from the plurality of light sources continues, and the light source control unit makes the amount of emitted light beams, which is set to the specific light source in a case where the light beams are sequentially emitted through the first pattern, greater than that in a case where the light beams are sequentially emitted through the second pattern, in the second control.

2. The projection-type display device according to claim 1, wherein the light source control unit sets the amounts of the emitted light beams, which are set to the light sources other than the specific light source in the second control, to zero.

3. The projection-type display device according to claim 1, wherein the plurality of light sources includes a red light source that emits red light beams, a green light source that emits green light beams, and a blue light source that emits blue light beams, and wherein the specific light source is the red light source.

4. The projection-type display device according to claim 2, wherein the plurality of light sources includes a red light source that emits red light beams, a green light source that emits green light beams, and a blue light source that emits blue light beams, and wherein the specific light source is the red light source.

5. A light source control method of a projection-type display device having a plurality of light sources that emit light beams with different colors, a projection unit that projects light beams based on image information among light beams emitted from the plurality of light sources onto a projection screen, and a temperature detection unit that detects a temperature, the method comprising a light source control step that selectively performs first control for setting respective amounts of light beams emitted from the plurality of light sources to a predetermined light emission amount pattern and sequentially emitting the light beams from the plurality of light sources through a predetermined light emission pattern, or second control for setting an amount of light beams emitted from a specific light source among the plurality of light sources to an amount of emitted light beams greater than the amounts of emitted light beams which are set by the light emission amount pattern, setting amounts of light beams emitted from light sources other than the specific light source among the plurality of light sources to an amount of emitted light beams smaller than the amounts of emitted light beams which are set by the light emission amount pattern, and sequentially emitting the light beams from the plurality of light sources through the light emission pattern, wherein in the light source control step, the second control is performed in a case where the temperature detected by the temperature detection unit is greater than a threshold value, and the first control is performed in a case where the temperature detected by the temperature detection unit is equal to or less than the threshold value, the light emission pattern includes a first pattern, in which a time period during which the light beams are sequentially emitted from the plurality of light sources and a time period during which the light beams are sequentially emitted from the light sources other than the specific light source among the plurality of light sources are alternately repeated, and a second pattern in which a time period during which the light beams are sequentially emitted from the plurality of light sources continues, and in the light source control step, the amount of emitted light beams, which is set to the specific light source in a case where the light beams are sequentially emitted through the first pattern, is made to be greater than that in a case where the light beams are sequentially emitted through the second pattern, in the second control.

6. The light source control method according to claim 5, wherein in the light source control step, the amounts of the emitted light beams, which are set to the light sources other than the specific light source in the second control, are set to zero.

7. The light source control method according to claim 5, wherein the plurality of light sources includes a red light source that emits red light beams, a green light source that emits green light beams, and a blue light source that emits blue light beams, and wherein the specific light source is the red light source.

8. The light source control method according to claim 6, wherein the plurality of light sources includes a red light source that emits red light beams, a green light source that emits green light beams, and a blue light source that emits blue light beams, and wherein the specific light source is the red light source.

* * * * *